United States Patent [19]

Jörg et al.

[11] Patent Number: 4,764,152
[45] Date of Patent: Aug. 16, 1988

[54] RUBBER COUPLING

[75] Inventors: Benno M. Jörg, Weinheim; Klaus Kurr, Weinheim-Hohensachsen; Heinz Seifert, Laudenbach, all of Fed. Rep. of Germany

[73] Assignee: Firma Carl Freudenberg, Weinheim/Bergstr., Fed. Rep. of Germany

[21] Appl. No.: 67,403

[22] Filed: Jun. 25, 1987

Related U.S. Application Data

[63] Continuation of Ser. No. 864,744, May 13, 1986, abandoned, which is a continuation of Ser. No. 651,875, Sep. 18, 1984, abandoned.

[30] Foreign Application Priority Data

Sep. 27, 1983 [DE] Fed. Rep. of Germany ....... 3334881

[51] Int. Cl.⁴ .................. F16D 3/76; F16C 27/00
[52] U.S. Cl. .................................. 464/89; 464/87
[58] Field of Search ............... 74/574; 464/87, 89, 464/90, 91, 92, 96, 180; 188/378, 379

[56] References Cited

U.S. PATENT DOCUMENTS

| | | | |
|---|---|---|---|
| 2,492,029 | 12/1949 | Beier | 464/91 |
| 3,823,619 | 7/1974 | Shotwell | 74/574 |
| 4,327,562 | 5/1982 | Gottschalk | 464/89 |
| 4,496,332 | 1/1985 | Keller et al. | 464/89 |

FOREIGN PATENT DOCUMENTS

| | | | |
|---|---|---|---|
| 725651 | 9/1942 | Fed. Rep. of Germany | 464/90 |
| 2831076 | 1/1980 | Fed. Rep. of Germany | 74/574 |
| 72945 | 5/1970 | German Democratic Rep. | |
| 590529 | 4/1959 | Italy | 464/89 |
| 734458 | 5/1980 | U.S.S.R. | 464/89 |

*Primary Examiner*—Daniel P. Stodola
*Attorney, Agent, or Firm*—Felfe & Lynch

[57] ABSTRACT

A resilient coupling for use between two, relatively-movable machine parts has a resilient body and an integral projection jutting out from the profile of the resilient body. A surface of the resilient body is arranged for joining, for example, adhesively, to one machine part and a surface of the projection arranged for joining, for example adhesively, to the other machine part, the jut of the projection and its surface for joining to the machine part preferably being perpendicular to each other.

18 Claims, 4 Drawing Sheets

RUBBER COUPLING

This application is a continuation of application Ser. No. 864,744 filed May 13, 1986, and now abandoned, which is a continuation parent application Ser. No. 651,875 filed Sept. 18, 1984 and now abandoned.

BACKGROUND OF THE INVENTION

The invention relates to a resilient rubber coupling for use between two, relatively-movable machine parts.

A resilient rubber coupling is disclosed in U.S. Pat. No. 3,823,619 as part of a torsional-vibration damper between relatively-movable machine parts. One machine part is within the other, and a resilient rubber body couples facing peripheral surfaces in the radial direction. When one of the machine parts is angularly displaced relative to the other, the resilient body is stressed in tension in its entirety and correspondingly deformed. This can result in radial displacement of the coupled machine parts, especially when soft resilient material has been used, and this is highly undesirable.

With a view to eliminating such difficulties, a secondary guide supports two machine parts on each other in the rubber coupling disclosed in East German patent No. 72,945. The guide is metallic, however, and thus results in undamped transmission of solid-borne sound. Moreover, the manufacture of the secondary guide means is relatively complicated and, therefore, uneconomical.

SUMMARY OF THE INVENTION

The object of the invention is, therefore, to provide a resilient, e.g. rubber, coupling which is easy to produce, assures good guidance of coupled, relatively-movable machine parts relative to each other, and substantially suppresses the transmission of solid-borne sound between the coupled machine parts.

In accordance with the invention, this object is achieved with a resilient, e.g. rubber, coupling having a resilient body and at least one, integral projection which juts out from the profile of the resilient body, preferably perpendicularly to bi-directional relative motion between two machine parts coupled therewith, in use. In use, too, the projection is joined, for example with an adhesive surface, to one machine part and the resilient body is joined, for example with another adhesive surface, to the other machine part in such a way that other facing surfaces between the coupling and the two parts form relatively movable guide surfaces therebetween.

With this coupling, relative displacement of the machine parts is absorbed mainly through elastic deformation of the projection while the rest of the resilient body is substantially unaffected thereby. As a result, the resilient body substantially retains its original shape regardless of the magnitude of the relative displacement of the machine parts, and non-varying coordination of the facing guide surfaces is thus assured. Also, relative deflective movement of the machine parts in response to the relative motion thereof is substantially prevented.

The compliance of the coupling is essentially due to the deformability of the projection, that is to say, to the resilience of the rubber material used, the shape of the projection, and the orientation of the projection in relation to the direction of motion. Guidance is not a primary consideration in the design of the projection. The projection can, therefore, be given a shape completely neutral to guidance, with a view to securing particularly high resilience, for example, which is highly desirable in many cases.

The cross-sectional loading of the projection under operating conditions should be as uniform as possible. This condition is satisfied especially well with a design in which the adhered surface of the projection extends parallel to the direction of relative motion between the coupled machine parts and the projection juttingly extends at right angles thereto, or vice versa, in which the adhered surface extends at right angles to the direction of relative motion and the projection, parallel thereto. The latter alternative results in pronounced stressing of the material and diminished movability but allows to transmit great forces. Besides, even adhering the relatively-movable machine part to the surface of the projection results in a further guide moment which may be intensified by the projection extending parallel to the direction of motion.

The facing guide surfaces of the coupling may bear on each other. This provides the particularly good guidance but also makes it necessary, initially, to overcome the static friction between the guide surfaces upon relative motion of the machine parts. In some applications, this may be detrimental, and it has proved advantageous in such applications to space the guide surfaces apart. The size of the clearance is dictated by the required guiding precision in the direction of motion. In most cases, the latter will readily tolerate a clearance a few tenths of a millimeter wide.

To reduce further the frictional resistance from the guide surfaces bearing on each other, the clearance may be filled with a viscous liquid or a substance having lubricating action. It will then also damp well the relative movement of the coupled machine parts, as for a vibration damper, for example. Alternatively, if the resilient, rubber material has practically no damping action, a low-viscosity liquid may be chosen to provide mainly vibration-absorbing action, or the high-viscosity liquid may be chosen to provide mainly vibration-damping action, as required by a particular application.

A surface-active substance may also be used in clearance between the guide surfaces. In most cases, this obviates the need for all-round sealing of the clearance. Capillary forces can be relied on to hold a surface-active substance in the clearance regardless of the orientation of the coupling if the clearance is sufficiently narrow.

For the other clearance fillings, the clearance between the guide surfaces may also be sealed all around by providing projections on opposite sides of the resilient body, for example. In that case, the clearance space can also be pressurized. Varying the pressure then can vary the depth of the clearance. This possibility is of considerable importance with respect to adjusting the damping action of a vibration damper, for example. Such adjustment may be made under operating conditions, if desired, and may be based on a momentary operating status.

As a rule, the projection and the rubber coupling body are a monolithic block of homogeneous material. The differential compliance of the resilient body and its projection therefore are determined mainly by their external configurations. If desired, the latter may be modified by a chip-removing technique to adapt the relative compliances to the specific requirements of a particular application.

The dimensions for proper compliance relationship can be calculated readily. They should be chosen so that the ratio of the elasticity in shear, torsion, or bending of the resilient body to the projection, or, if there are more than one resilient body and/or projection, the sum of the elasticity thereof is less than 0.5, as determined in the direction of relative motion between the machine parts in use. The preferred range is from 0.5 to 0.25. The projections themselves may have any desired shape. However, an embodiment in which the projections are formed by striplike extensions extending perpendicular to the direction of motion is preferred. With such a shape, which can readily be produced, relatively large forces can be transmitted through the projections in the direction of motion.

The guide surfaces may be provided by interleaved guide strips which extend parallel to the direction of motion. Undesired transverse motions of the coupled machine parts can thus be effectively limited or prevented. This also enlarges the guide surface in comparison with a plane design to improve the damping characteristics when a viscous medium is used in the space between the guide surfaces, for example.

The proposed rubber coupling may have practically any desired shape, depending on the direction of the relative motions to be introduced. A plane design will render it suitable for damping rectilinear motions, while a design having rotational symmetry will render it suitable for a torsional-vibration damper, for example.

BRIEF DESCRIPTION OF THE DRAWINGS

The invention will now be described in greater detail with reference to the accompanying drawings which illustrate, but do not limit the claimed invention, and wherein:

DETAILED DESCRIPTION OF THE INVENTION

Figure 1:
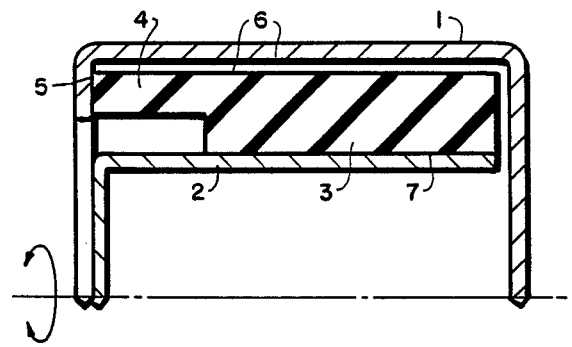
FIG. 1 is a sectional elevation of a first embodiment.

The rubber coupling shown in FIG. 1 in diametric section has rotational symmetry. It is formed of two, nested, cup-shaped machine parts 1 and 2 made of sheet steel.

Disposed between the two machine parts 1 and 2 is a resilient body 3 having a thinner, integral projection 4 which extends in the axial direction. The projection 4 is bonded to outer machine part 1 by vulcanization over an adhesive surface 5 at its end face. The resilient body 3 is vulcanized over its entire facing surface 7 onto the inner machine part 2. The other facing surfaces of the outer machine part 1, the resilient body 3 and the projection 4 form unconnected, spaced guide surfaces 6 for guidingly bearing movably on each other.

The torsional rigidity of the resilient body 3 is greater than that of the projection 4. The distortions of the coupling resulting from relative angular displacements between the machine parts 1 and 2 as indicated by the arrow therefore affect mainly the projection 4 while the resilient body 3 remains substantially unaffected. As a result, good radial support between the two machine parts 1 and 2 is assured even when a relatively large angular displacement occurs.

Figure 2:
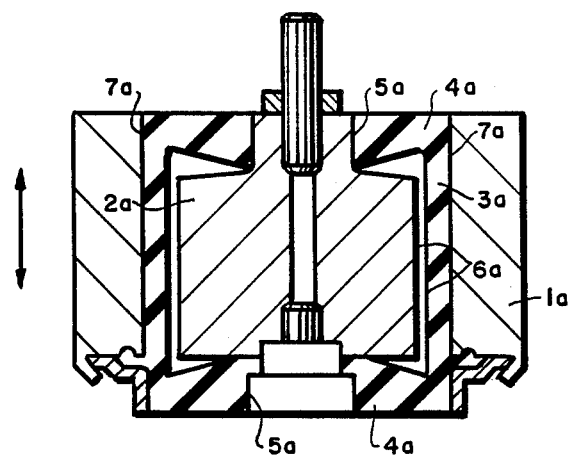
FIG. 2 is a sectional elevation of a second embodiment.

FIG. 2 illustrates the use of the rubber coupling in a longitudinal-vibration damper. It has rotational symmetry and comprises an outer machine part 1a which encloses an inner machine part 2a in the radial direction.

Disposed between the two machine parts is a resilient body 3a which is vulcanized overall onto the inside wall 7a of the outer machine part 1a. It also has two, circular, inwardly-jutting projections 4a which, by their innermost faces 5a, are fixed to the inner machine part 2a. Between facing guide surfaces 6a, there is a clearance of small width which assures good movability of the two machine parts 1 and 2 relative to each other and, at the same time, sufficiently-precise guidance.

Figure 3:
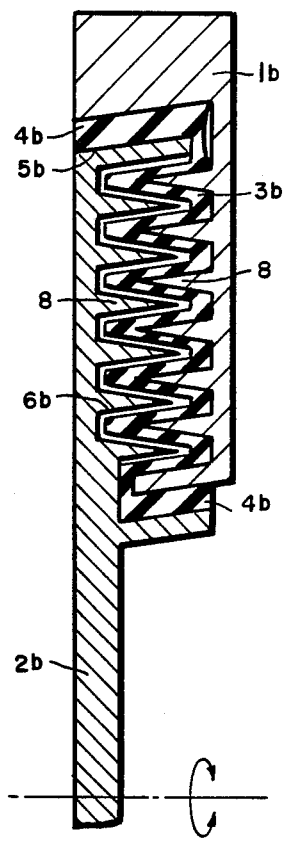
FIG. 3 is a sectional elevation of a third embodiment.

The embodiment of FIG. 3 illustrates a rubber coupling for use as a torsional-vibration absorber for high rotative speeds. The latter consists of an outer machine part 1b and an inner machine part 2b formed, for example, by a flange of a disc. The outer and inner machine parts have interleaved annular guide strips 8 of triangular section. A layer of rubber is vulcanized along the guide strips 8 of the outer machine part 1b to form a resilient body 3b. The resilient body 3b is slightly spaced from the guide strips 8 of the inner machine part. As a result, the surfaces 6b therebetween form guides which are readily movable relative to each other, but guide on both sides in the radial direction. The clearance between the guide surfaces 6b holds a lubricant for reducing the friction of contact from the relative movement. The outer machine part 1b also encloses the totality of the axially projecting guide strips 8 of the inner machine part with a U-shaped overall profile. In proximity to the boundaries of the profile, the resilient body 3b enlarges into projections 4b bonded the inner machine part through adhesive surfaces 5b.

Figure 4:
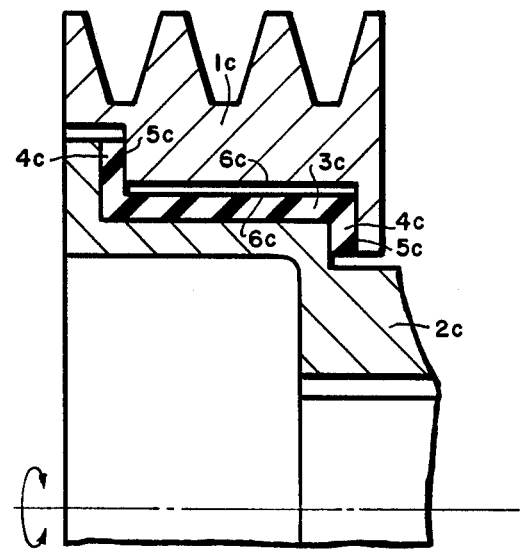
FIG. 4 is a sectional elevation of a fourth embodiment.

The rubber coupling shown in diametric section in FIG. 4 also has rotational symmetry. It is disposed between two, radially-arranged, outer and inner machine parts 1c and 2c. The outer machine part 1c is a belt pulley, and the inner machine part 2c is the associated hub.

A resilient body 3c is vulcanized as a continuous layer across an axial surface 7c of the inner machine part. The resilient body is slightly spaced radially from the adjacent inside surface of the outer machine part 1c to form guide surfaces 6c for radial coordination of relative movement between the machine parts.

The resilient body 3c has Z-arranged, opposite ends forming projections 4c. The latter are bonded to the outer machine part along radial adhesive surfaces 5c.

Figure 5:
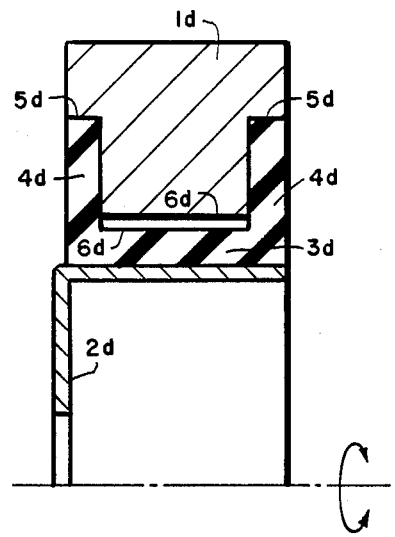
FIG. 5 is a sectional elevation of a fifth embodiment.

FIG. 5 is a diametric section of another rotationally-symmetric rubber coupling for a torsional-vibration damper. An outer machine part 1d radially encloses an inner machine part 2d. A resilient body 3d is vulcanized onto the radially-outward surface 7d of the inner machine part 2d. On its opposite ends, the resilient body 3d has corresponding projections 4d which extend outwardly in the manner of flanges of a U-shaped profile and which are vulcanized along their outermost surfaces 5d onto the outer machine part 1d. In addition to good radial guidance of the outer machine part through the guide surfaces 6d, this embodiment provides some axial guidance. This, however, does not appreciably interfere with the angular displaceability of the two machine parts. And while its manufacture is simple, the coupling can be used in practically any position.

Figure 6:
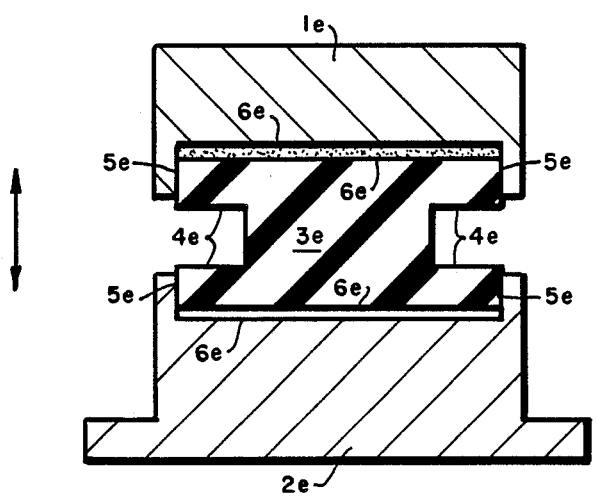
FIG. 6 is a sectional elevation of a sixth embodiment.

FIG. 6 illustrates the use of a rubber coupling having two, double-ended operative sides in a vibration damper for rectilinear motion. The two machine parts 1e and 2e are provided with facing grooves accommodating between them a resilient body 3e, each with projections 4e on opposite ends of both sides in the grooves.

The projections 4e are made of the same material as the resilient body 3e and are integral therewith. They are bonded to the machine parts 1e and 2e only along end adhesive surfaces 5e which are parallel to the relative motion between the machine parts. The other facing surfaces of the resilient body 3e, the projections 4e, and the two machine parts 1e, 2e form unattached guide surfaces 6e. These are spaced apart, and the space so formed is filled with a damping liquid.

Figure 7:
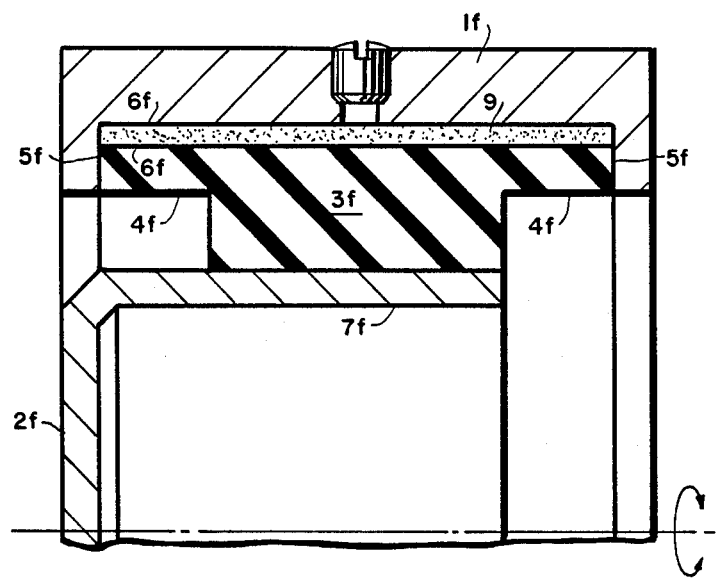
FIG. 7 is a sectional elevation of a seventh embodiment.

FIG. 7 is a diametric section of a rubber coupling in another torsional-vibration damper. The outer machine part 1f encloses the inner machine part 2f in the radial direction. Vulcanized onto machine part 2f along an axial surface 7f between the machine parts is a resilient body 3f. On its opposite sides, it is provided with projections 4f which extend axially outward to adhesive surfaces 5f which are vulcanized onto the outer machine part 1f. In addition to good radial guidance of the outer machine part, this embodiment provides some axial guidance through spaced guide surfaces 6f between the projections and body and part 1f. This will not appreciably interfere with the angular displaceability of the two parts. A clearance 9 between the guide surfaces 6f is filled with a damping liquid. Further, its manufacture is simple, and the coupling can be used in practically any position.

The couplings according to the invention and certain of the described preferred embodiments thereof are, therefore, particularly useful as the coupling for the inertial mass of a torsional-vibration damper.

It will be appreciated that the instant specification and claims are set forth by way of illustration and not of limitation, and that various changes and modifications may be made without departing from the spirit and scope of the present invention.

What is claimed is:

1. A guiding, resilient coupling comprising, in combination:
    (a) two machine parts arranged in adjacent relationship and having respective, adjacent, facing, spaced apart surfaces defining a gap therebetween, said machine parts being movable relative to each other in at least two orthogonal directions, one of which is substantially transverse to the average longitudinal direction of said gap; and
    (b) means for coupling said machine parts together comprising:
        (1) a resilient body arranged in said gap and having a profile substantially matching the cross-sectional shape of, and substantially filling at least a portion of, said gap, thereby defining external surfaces which face at least a portion of the gap-facing surfaces of said machine parts;
        (2) at least one resilient projection integral with said resilient body and jutting out from said profile of said resilient body;
        (3) adhesive joining means comprising adhesive on a surface of each of said resilient body and said resilient projection, adhesively joining each such surface to a respective one of said machine parts;
        (4) the facing surface of said resilient body which is not joined to a respective one of said machine parts being non-integrally, intimately adjacent to the gap-facing surface of such machine part, thereby providing guidance in at least one of said orthogonal directions;

whereby the external surfaces of said resilient body within said gap which are not joined to a respective, facing surface of a machine part by said adhesive joining means form guiding sufaces for such machine part and wherein said resilient body serves as a buffer against relative movement of said two machine parts in said one direction without the imposition of any substantial stress due to relative movement of said machine parts in another, orthogonal direction.

2. The coupling of claim 1, wherein the projection juts perpendicularly to the relative motion between the machine parts.

3. The coupling of claim 2, wherein the projection is strip like and parallel to one direction of relative motion between the machine parts in use.

4. The coupling of claim 2, wherein the guide surfaces are spaced apart.

5. The coupling of claim 4, and further comprising a lubricating substance filling the space between the guide surfaces.

6. The coupling of claim 5, and further comprising a viscous liquid filling the space between the guide surfaces.

7. The coupling of claim 4, and further comprising means for sealing the space between the guide surfaces, whereby the space may be pressurized.

8. The coupling of claim 1, wherein the guide surfaces are spaced apart.

9. The coupling of claim 8, and further comprising a lubricating substance filling the space between the guide surfaces.

10. The coupling of claim 8, and further comprising a viscous liquid filling the space between the guide surfaces.

11. The coupling of claim 8, and further comprising means for sealing the space between the guide surfaces, whereby the space may be pressurized.

12. The coupling of claim 8, wherein the projection is strip like and parallel to one direction of relative motion between the machine parts in use.

13. The coupling of claim 1, wherein the ratio of the elasticity of the resilient body to that of the projection is less than 0.5.

14. The coupling of claim 1, wherein the ratio of the elasticity of the resilient body to that of the projection is in a range of from 0.5 to 0.25.

15. The coupling of claim 1, wherein the projection is strip like and parallel to one direction of relative motion between the machine parts in use.

16. The coupling of claim 1 wherein the resilient body is rotationally symmetric.

17. The coupling of claim 1, wherein the surface of said projection that is adhesively joined to its respective machine part is substantially parallel to said at least one direction in which said machine parts are relatively movable.

18. The coupling of claim 1, wherein said two machine parts are rotatable about a common axis and, with said coupling means, form a torsional vibration damper.

* * * * *